US012649682B2

(12) United States Patent
Dinkel et al.

(10) Patent No.: US 12,649,682 B2
(45) Date of Patent: Jun. 9, 2026

(54) ASSEMBLY AND METHOD FOR CLEAVING A GLASS BODY WITH A LASER

(71) Applicant: OpTek Systems, Inc., Greenville, SC (US)

(72) Inventors: Duane Dinkel, Simpsonville, SC (US); Sean Kelly, Maudlin, SC (US); Mike O'Key, Oxford (GB); Camden Druga, Greenville, SC (US)

(73) Assignee: OpTek Systems, Inc., Greenville, SC (US)

( * ) Notice: Subject to any disclaimer, the term of this patent is extended or adjusted under 35 U.S.C. 154(b) by 920 days.

(21) Appl. No.: 17/823,858

(22) Filed: Aug. 31, 2022

(65) Prior Publication Data

US 2023/0124283 A1 Apr. 20, 2023

Related U.S. Application Data

(63) Continuation-in-part of application No. PCT/US2021/042771, filed on Jul. 22, 2021.

(Continued)

(51) Int. Cl.
*C03B 37/16* (2006.01)
*B23K 26/08* (2014.01)
(Continued)

(52) U.S. Cl.
CPC .......... *C03B 37/16* (2013.01); *B23K 26/0823* (2013.01); *B23K 26/38* (2013.01);
(Continued)

(58) Field of Classification Search
CPC .. B23K 37/0426; B23K 26/38; B23K 26/364; C03B 33/095; C03B 33/06; C03B 33/091
See application file for complete search history.

(56) References Cited

U.S. PATENT DOCUMENTS 4,820,321 A 4/1989 Presby
4,932,989 A * 6/1990 Presby ................. G02B 6/4203
219/121.73

(Continued)

FOREIGN PATENT DOCUMENTS

CN 1308031 A 8/2001
EP 0391598 B1 5/1994
(Continued)

OTHER PUBLICATIONS

European Search Report for Application EP 23 19 3560 dated Jan. 15, 2024, 2 pages.

(Continued)

*Primary Examiner* — Thien S Tran
(74) *Attorney, Agent, or Firm* — Howard & Howard Attorneys PLLC

(57) ABSTRACT

A cleaving assembly and a method for cleaving a glass rod and end cap having diameters of at least 125 µm and a face at a desired angle greater than 0 degrees are disclosed. The assembly comprises a laser device for emitting a laser beam, a rotating device, and a positioning fixture. The rotating device has a head that rotates about a central axis that is orthogonal to the laser beam. The positioning fixture is operatively mounted to the head and centered axially along the central axis and is also rotatably driven by the rotating device. The positioning fixture has a tapered surface that is transverse to the central axis and that supports the glass rod at a predetermined angle relative to the central axis. Rotation of the positioning fixture about the central axis when the glass rod and end cap is exposed to the laser beam, cleaves the face at the desired angle.

24 Claims, 14 Drawing Sheets

Related U.S. Application Data

(60) Provisional application No. 63/073,705, filed on Sep. 2, 2020, provisional application No. 63/055,307, filed on Jul. 22, 2020.

(51) Int. Cl.

| | |
|---|---|
| *B23K 26/38* | (2014.01) |
| *B23K 26/402* | (2014.01) |
| *B23K 37/04* | (2006.01) |
| *B23K 101/06* | (2006.01) |
| *B23K 103/00* | (2006.01) |
| *C03B 33/06* | (2006.01) |
| *C03B 33/095* | (2006.01) |
| *G02B 6/25* | (2006.01) |

(52) U.S. Cl.
CPC ........ *B23K 26/402* (2013.01); *B23K 37/0426* (2013.01); *C03B 33/06* (2013.01); *C03B 33/0955* (2013.01); *G02B 6/25* (2013.01); *B23K 2101/06* (2018.08); *B23K 2103/54* (2018.08); *C03B 2203/02* (2013.01)

(56) References Cited

U.S. PATENT DOCUMENTS

| | | | | |
|---|---|---|---|---|
| 5,256,851 | A | 10/1993 | Presby | |
| 5,500,911 | A * | 3/1996 | Roff | G02B 6/4207 |
| | | | | 385/33 |
| 5,501,385 | A | 3/1996 | Halpin | |
| 5,779,753 | A | 7/1998 | Vetter et al. | |
| 5,940,557 | A * | 8/1999 | Harker | G02B 6/4207 |
| | | | | 385/33 |
| 6,246,026 | B1 * | 6/2001 | Vergeest | G02B 6/25 |
| | | | | 219/121.72 |
| 6,774,341 | B2 | 8/2004 | Ohta | |
| 7,142,741 | B2 | 11/2006 | Osborne | |
| 7,216,512 | B2 * | 5/2007 | Danley | B23K 26/0823 |
| | | | | 219/121.72 |
| 8,340,485 | B2 | 12/2012 | Danley et al. | |
| 8,961,036 | B2 | 2/2015 | Webb et al. | |
| 9,089,931 | B1 * | 7/2015 | Carberry | G02B 6/25 |
| 9,205,609 | B1 | 12/2015 | Danley et al. | |
| 9,416,046 | B2 | 8/2016 | Carberry et al. | |
| 9,690,048 | B2 | 6/2017 | Hagen et al. | |
| 9,817,187 | B2 * | 11/2017 | Mizushima | G02B 6/2555 |
| 9,915,791 | B2 * | 3/2018 | Woodward | B23K 26/3576 |
| 10,451,815 | B2 | 10/2019 | Flaig et al. | |
| 2002/0175151 | A1 * | 11/2002 | Ohta | G02B 6/2552 |
| | | | | 219/121.73 |
| 2003/0205562 | A1 | 11/2003 | Vergeest et al. | |
| 2004/0047587 | A1 * | 3/2004 | Osborne | G02B 6/25 |
| | | | | 385/147 |
| 2006/0137403 | A1 | 6/2006 | Barr et al. | |
| 2012/0305807 | A1 * | 12/2012 | Schoellner | B23K 26/043 |
| | | | | 250/492.1 |
| 2014/0116995 | A1 | 5/2014 | Berg et al. | |
| 2014/0332510 | A1 | 11/2014 | Danley et al. | |
| 2015/0030291 | A1 | 1/2015 | Webb et al. | |
| 2015/0218038 | A1 | 8/2015 | Carberry et al. | |
| 2017/0010416 | A1 * | 1/2017 | Hagen | G02B 6/3616 |
| 2020/0292756 | A1 | 9/2020 | Langseth et al. | |

FOREIGN PATENT DOCUMENTS

| | | |
|---|---|---|
| EP | 0558230 B1 | 4/1997 |
| EP | 1330331 B1 | 4/2009 |
| KR | 101763637 B1 | 8/2017 |
| WO | 2022020587 A1 | 1/2022 |

OTHER PUBLICATIONS

Zheng, Wenxin et al., "Ball-Shaped End-Caps for Fiber Laser Systems", Proc. of SPIE, vol. 10525, 9 pages.

English language abstract for KR 101763637 B1 extracted from espacenet.com database on Sep. 1, 2022, 1 page.

International Search Report for Application No. PCT/US2021/042771 dated Nov. 17, 2021, 1 page.

Optek Systems, "Laser Processed Fiber Assemblies Brochure", 2020-2021, 10 pages.

U.S. Appl. No. 17/905,696, filed Sep. 6, 2022.

Chinese Search Report for Application CN 2021800127477 dated Feb. 6, 2025, 2 pages.

English language abstract for CN 1308031 A extracted from espacenet.com database on Feb. 28, 2025, 1 page.

* cited by examiner

FIG. 3
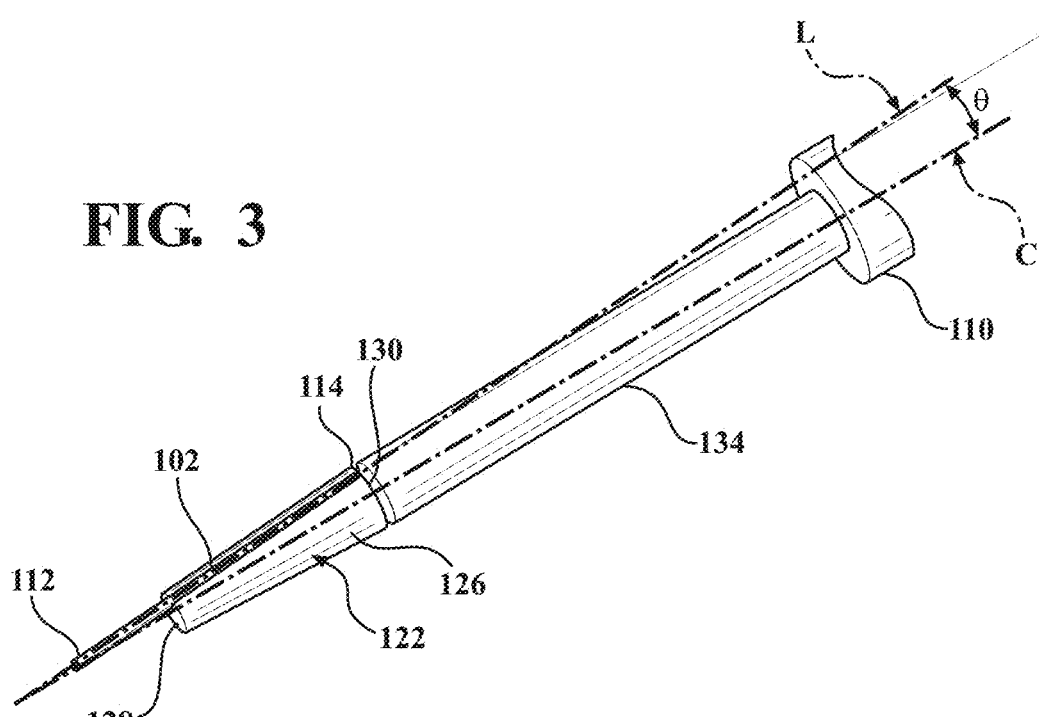
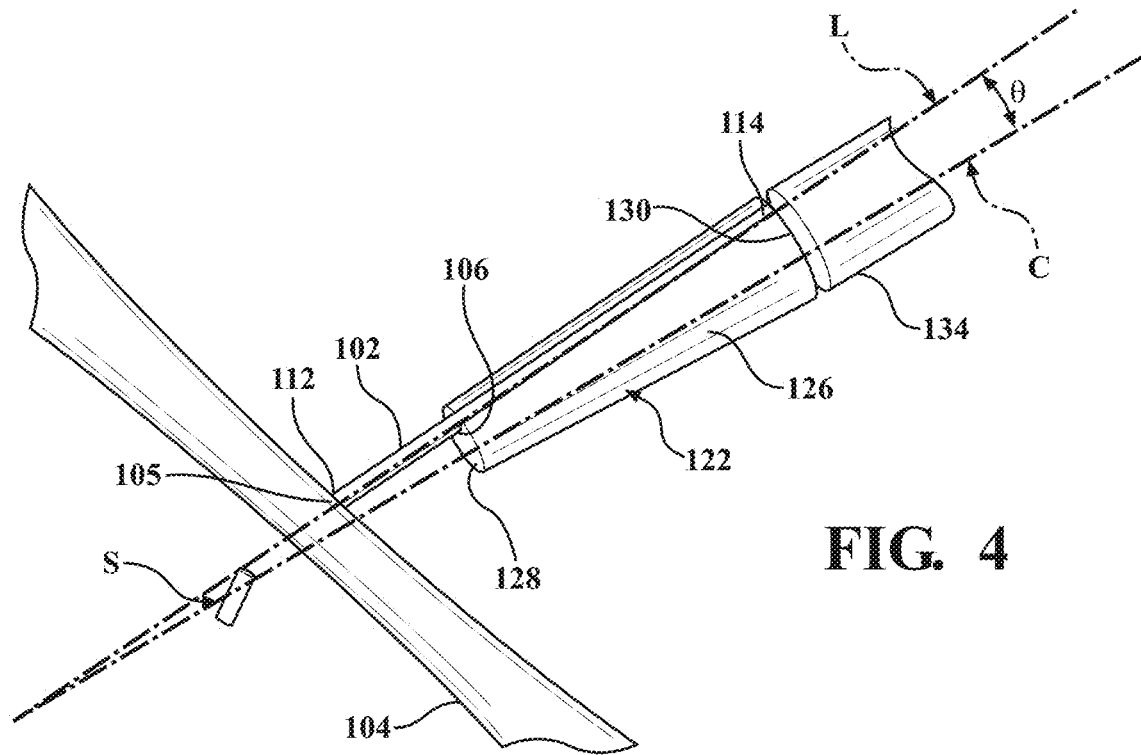
FIG. 4

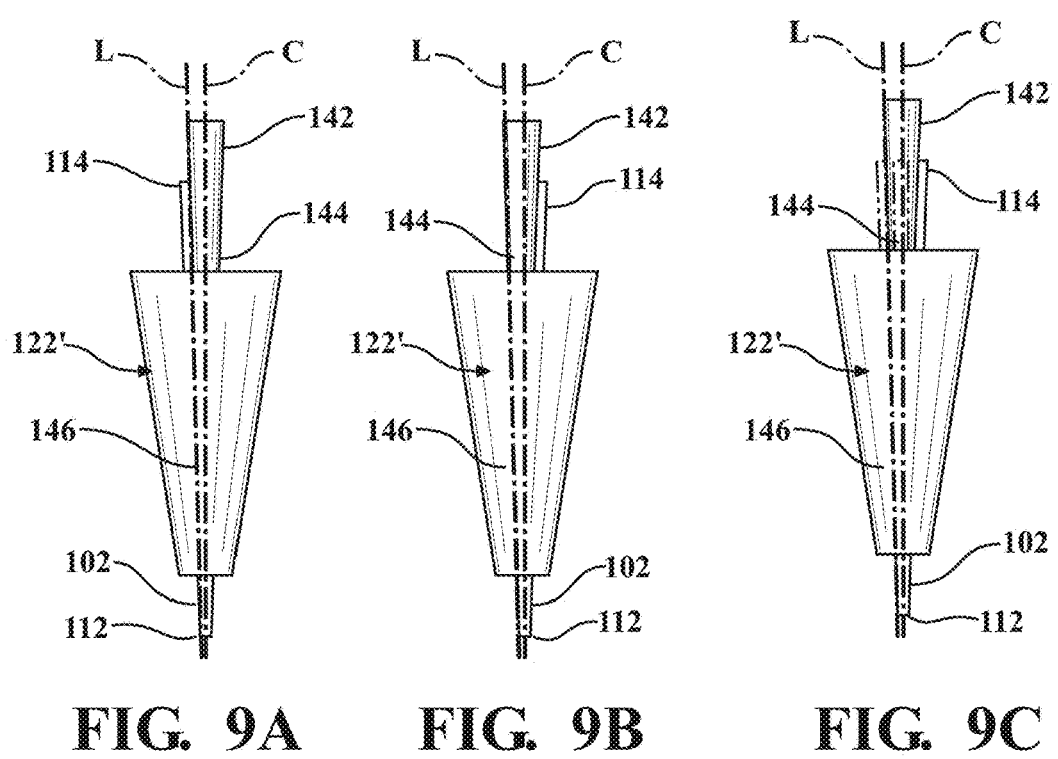
FIG. 9A       FIG. 9B       FIG. 9C
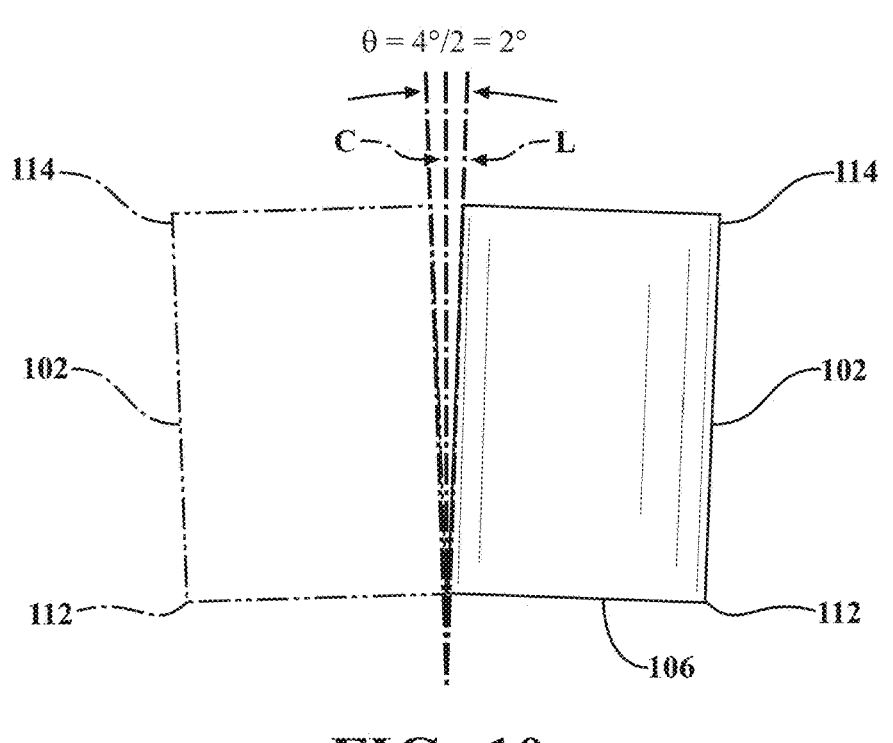
FIG. 10

ASSEMBLY AND METHOD FOR CLEAVING A GLASS BODY WITH A LASER

CROSS REFERENCE TO RELATED APPLICATIONS

This application is a continuation-in-part application that claims priority to PCT/US2021/042771, filed Jul. 22, 2021, which claims priority to U.S. Provisional Patent Application No. 63/055,307 filed on Jul. 22, 2020 and U.S. Provisional Patent Application No. 63/073,705 filed on Sep. 2, 2020, all of which are hereby incorporated by reference.

BACKGROUND

1. Field of the Invention

This invention relates to an assembly and method for cleaving or cutting a glass body, such as rod, capillary, or optical fiber and more particularly, but not exclusively, an angle cleaving or cutting assembly for cleaving or cutting a cylindrical glass body with a laser.

2. Description of the Prior Art

Various techniques are known for cleaving or cutting optical fibers and achieving an optical-grade surface, which can be characterized by low loss, low scatter and unintentional aberration. Some cleaving techniques require mechanical scoring, followed by a torsional break, followed by a mechanical polish or lapping to rid the surface of hackle, chatter, and cracks brought on by the mechanical scoring. Other techniques, such as laser processing under controlled optical conditions (such as disclosed in U.S. Pat. No. 7,142,741 B2), are capable of achieving similar optical properties as the mechanical polishing techniques. There are advantages and disadvantages associated with these two techniques and, depending on the specific application, one method may be preferred over the other.

Since the early 2000's, laser processing of optical fiber has become an industry-accepted method of high-volume production for both free-space and connectorized fiber applications, though mechanical polishing remains the dominant method of processing optical fiber connectors because of its low entry cost and versatility. Historically, one disadvantage of mechanical processing optical fiber, both free-space and connectorized, is that the surface deformations brought on by mechanical scribing need to be completely removed, often requiring lengthy and costly polishing steps. Additional disadvantages are the inability to polish the optical fibers to precise axial dimensions, the inability to align the stress members with polarization maintaining fibers relative to prescribed angles, and the increased tooling costs associated with achieving non-standard surface angles (i.e., outside of 0° or 8°).

Most recently, however, with the influx of high-power transmission needed for 5G, autonomous vehicle sensors, medical devices, and military weapons, the silica deposits embedded in micro-abrasions found on the surface of optical fiber from conventional polishing techniques are found to be highly absorptive and disruptive to the optical transmissions, creating undesirable back reflections, aberration, and beam scatter. When these detriments are present, ultimately device failure occurs (optical fiber or active devices). For this reason, laser processing of conventional optical fibers used in these applications is gaining significant momentum, however, there are still disadvantages of such laser processing of large diameter glass bodies.

Today's laser processing methods are well-suited for conventional optical fibers, specifically, optical fibers that are comprised of cores and claddings with total combined diameters of 125 μm or less. However, laser processing optical fibers or other glass bodies with combined core/clad diameters greater than 125 um becomes problematic due to energy differentials of the entrance beam relative to the exit beam. Such entry/exit effects create undulating surfaces that impair optical transmission, creating uncontrollable back reflections, aberrations, and introducing beam skew and non-Gaussian energy distributions of the transmitted beam. The surface undulations are further exacerbated during angled cleaving of optical fibers, which heighten the entry/exit effects because of the increased laser-cutting lengths along the hypotenuse.

SUMMARY

The subject invention provides a precise, high-volume assembly and method for laser cleaving a large diameter glass body, such as glass rods and end caps, greater than 125 um, having a face at a desired angle greater than 0 degrees and with reduced light-scattering or absorbing detriments and unintentional aberration. The assembly and method comprises a laser device for emitting a laser beam, a rotating device, and a positioning fixture. The rotating device has a head that rotates about a central axis that is orthogonal to the laser beam. The positioning fixture is operatively mounted to the head and centered axially along the central axis and is also rotatably driven by the rotating device. The positioning fixture has a tapered surface that is transverse to the central axis and that supports the glass rod at a predetermined angle relative to the central axis. Rotation of the positioning fixture about the central axis when the glass rod is exposed to the laser beam, cleaves the face of the glass body at the desired angle due to the glass body being supported transverse to the central axis.

The subject invention further provides a method of manufacturing an optical fiber having a transmitting portion and an end cap with a cleaving assembly. The cleaving assembly includes a laser device for emitting a laser beam, a rotating device, and a positioning fixture. The method includes the steps of providing the transmitting portion extending between a first end and a second end and having a diameter of at least 125 μm and providing the end cap having a diameter and formed of a glass material extending between a terminal end to be cleaved at a desired angle and a mounting end with an initial length. The method further includes securing the first end of the transmitting portion to the mounting end of the end cap. Next, the rotating device and the positioning fixture are centrally aligned along a central axis that is orthogonal to the laser beam and the positioning fixture is mounted to the head of the rotating device. The transmitting portion is supported along a tapered surface of the positioning fixture, so that the transmitting portion and the end cap extends transverse to the central axis at a predetermined angle, and the positioning fixture and the head of the rotating device are rotated about the central axis such that the laser beam cleaves the terminal end of the end cap at the desired angle corresponding to the predetermined angle and at a final desired length. The subject invention allows for the precise desired length of the end cap to be obtained, which heavily dictates the optical properties of the transmitting output from the end cap. According to Snell's Law, the beam propagation from the transmitting portion into the end cap will immediately diverge until the beam encounters a change in refractive index, which in this case will be the air boundary of the end cap at which case it converges back into the end cap. As the beam exits the end cap, the desired (or modeled) length ensures that the beam exits with the desired optical properties. If the length of the end cap is not the desired length, either too long or too short, the emitting beam exits at the undesired mode field diameter resulting in uncontrolled energy density which is detrimental for high energy applications. Further, undesired length can create a divergence or convergence that is equally undesired for the given application.

Another embodiment of the subject invention provides a method of manufacturing fiber end caps with a face at a desired angle greater than 0 degrees and with reduced light-scattering or absorbing detriments with a cleaving assembly. The cleaving assembly includes a laser device for emitting a laser beam, a rotating device having a head, and a positioning fixture. The method includes the steps of providing a support rod extending between a first end and a second end and having a diameter of at least 125 μm, providing an end cap formed of a glass material extending between a terminal end to be cleaved at the desired angle and a mounting end, the end cap having a diameter the same or less than the diameter of the support rod and having a length of less than 1 mm Next, the first end of the support rod is secured to the mounting end of the end cap to form a temporary glass body. The rotating device and the positioning fixture centrally are aligned along a central axis that is orthogonal to the laser beam and the positioning fixture is mounted to the head of the rotating device. The temporary glass body is supported so that the temporary glass body extends along a tapered surface of the positioning fixture and the end cap extends transverse to the central axis at the desired angle. The positioning fixture and the head of the rotating device are rotated about the central axis while the temporary glass body is supported such that the laser beam cleaves the terminal end of the end cap at the desired angle corresponding to the predetermined angle. The end cap is then removed from the support rod to dissemble the temporary glass body and finishing the mounting end of the end cap to achieve an acceptable surface thereon.

The subject invention has numerous advantages over the prior art assemblies and methods. First, the subject invention provides a face that is substantially free of surface undulations and detriments allowing the glass bodies to be processed free of the light-scattering or absorbing detriments of mechanical polishing. As a result, when laser cleaving according to the subject invention, the face of the glass body does not demonstrate undesirable entry/exit effects, thus eliminating surface undulations that could lead to unintentional aberration, skew, loss, and energy distributions of the transmission exiting the large glass body. Another advantage of the subject invention is that multiple different positioning fixtures of different predetermine angles can be quickly interchanged on the rotating device while maintaining precision of the laser cleaving and at the precise desired angle.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a close-up perspective view of the positioning fixture attached to the rotating device;

FIG. 4 is a close-up view of the positioning fixture supported the glass body during rotation and cleaving with a laser beam;

FIGS. 9A-9B are schematic views of the positioning fixture shown in FIG. 8A;

FIG. 9C is a schematic view of the positioning fixture shown in FIG. 8A at discrete points of rotation about the central axis;

FIG. 10 is a close-up of the glass body at specific rotational angles;

DETAILED DESCRIPTION OF THE INVENTION

Figure 1:
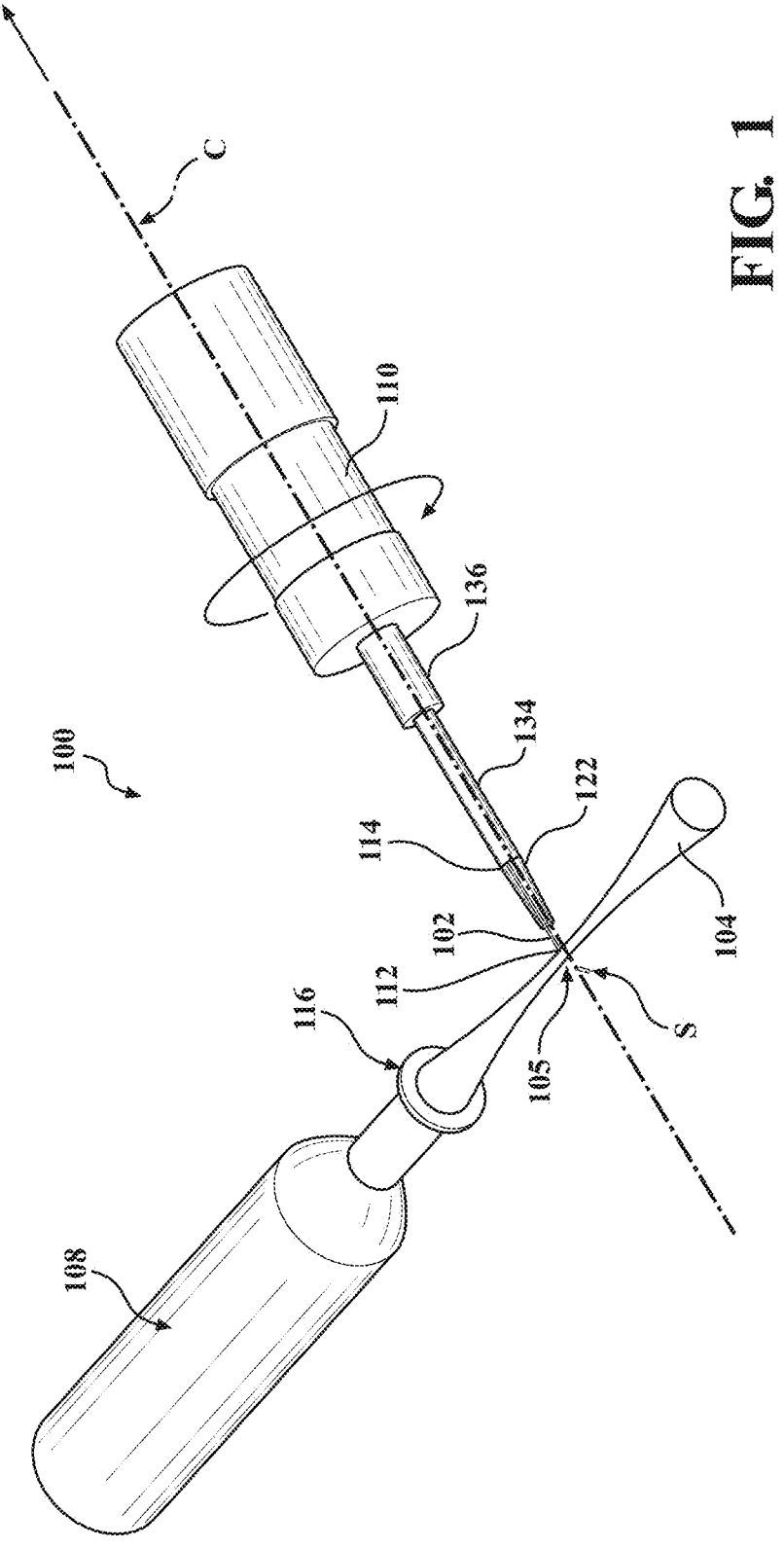
FIG. 1 is a perspective view of a cleaving assembly according to the subject invention having a laser device and a rotating assembly for cleaving a glass body, such as rod, capillary, or optical fiber.

The present invention relates generally to an assembly 100 and method of cleaving a glass body 102 with a laser beam 104 to a desired angle. The glass bodies 102, include, but are not limited to, glass rods, capillaries, ferrules, tubes, and optical fibers. Generally, the glass body 102 is cylindrical and are particularly useful in beveled surface applications and optical applications (high-power and other applications sensitive to back reflections, light scatter, beam skew and optical transmission). The assembly 100 can be used for angles greater than 0 degrees and will create the angle on a face 105 of the glass body 102 free of a lens or taper.

Referring to FIG. 1, a perspective view of one embodiment of the cleaving assembly 100 for cleaving the glass body 102 is shown generally having a laser device 108 and a rotating device 110. The glass body 102 may include a glass rod, a glass capillary, or an optical fiber. The glass body 102 has a diameter of at least 125 μm and would be considered by those of skill in the art as a large diameter when compared against a conventional, telecom-grade optical fiber. The glass body 102 extends along a longitudinal central axis C between a first end 112 and a second end 114. The first end 112 of the glass body 102 presents the face 105 to be cleaved or finished. The glass body 102 may be any desired length depending upon the particular application. The glass body 102 may be hollow or solid. Referring to one embodiment of the glass body 102 as a glass rod, preferably the glass rod would be solid. In another embodiment, when the glass body 102 is a glass capillary, the glass capillary may be hollow. In yet another embodiment when the glass body 102 is an optical fiber, the optical fiber comprises at least one core, which is formed of a glass material. Optionally, the optical fiber may include a cladding (not shown) surrounding the core and an outer coating (not shown) surrounding the core. Further, the optical fiber may include a plurality of cores. The subject invention may be practiced with any of the various different types of glass bodies described herein, but is particularly useful with solid glass rods of large diameters above 125 μm.

The laser device 108 emits the laser beam 104, preferably a carbon dioxide laser beam 104 with the wavelength of 10.6 μm. It is to be appreciated that other types of laser devices 108 having different types of beam shapes and different wavelengths may be used with the subject invention. For example, the laser device 108 may be quantum cascade laser, UV-excimer laser, semiconductor laser, or the like, and which may emit the laser beam 104 with a wavelength between 0.2 and 11 μm. The laser device 108 may include focusing systems 116 to direct and manipulate the laser beam 104 to the first end 112 of the glass body 102.

Figure 2:
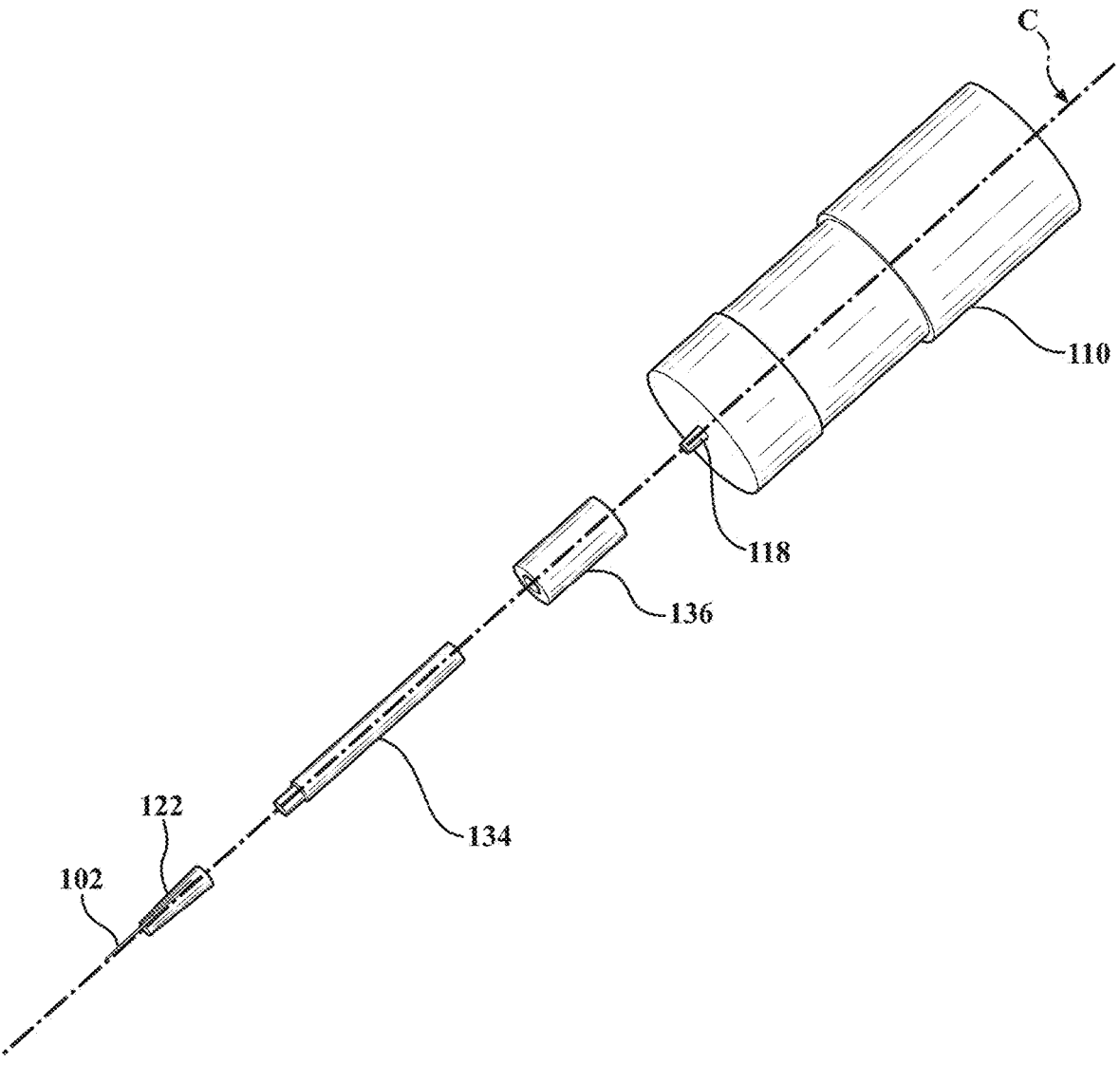
FIG. 2 is an exploded, perspective view of the rotating device and a positioning fixture used for cleaving the glass body.

Referring to FIG. 2, the rotating device 110 includes a head 118 that rotates about the central axis C that is orthogonal to the laser beam 104 emitted by the laser device 108. A positioning fixture 122 is operatively mounted to the head 118 and centered axially along the central axis C. The positioning fixture 122 is rotatably driven by the rotating device 110 about the central axis C. The positioning fixture 122 has a tapered surface 106 (best shown in FIG. 5) that is transverse to the central axis C and that supports the glass body 102 at a predetermined angle θ relative to the central axis C. Rotation of the positioning fixture 122 about the central axis C while laser beam 104 is directed toward the glass body 102 cleaves the face 105 of the glass body 102 at the desired angle due to the glass body 102 being supported transverse to the central axis C.

Figures 5, 6A, 6B, 6C:
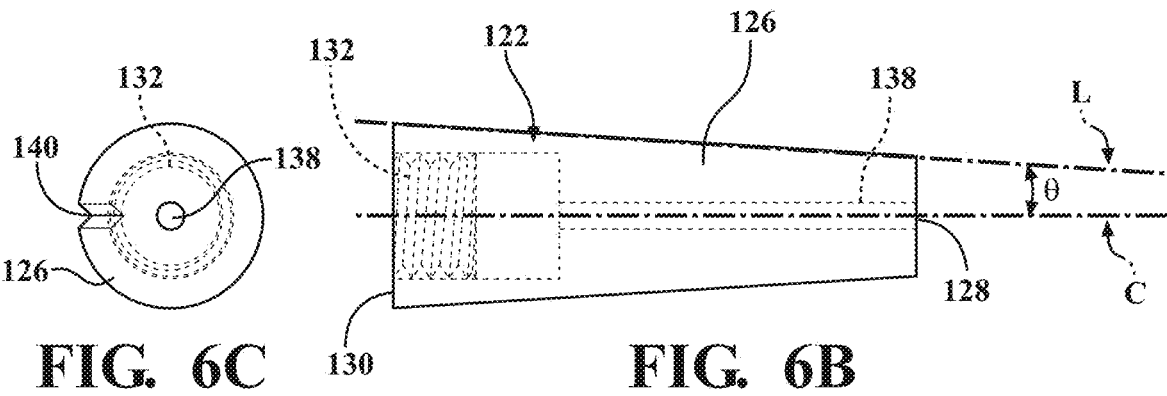
FIG. 5 is a close-up view of the positioning fixtured for cleaving a flat face on the glass body.
FIG. 6A is a perspective view of a positioning fixture according to one embodiment of the subject invention.
FIG. 6B is a cross-sectional view of the positioning fixture shown in FIG. 6A.
FIG. 6C is an end view of the positioning fixture shown in FIG. 6A.
Figures 7, 8A, 8B, 8C:
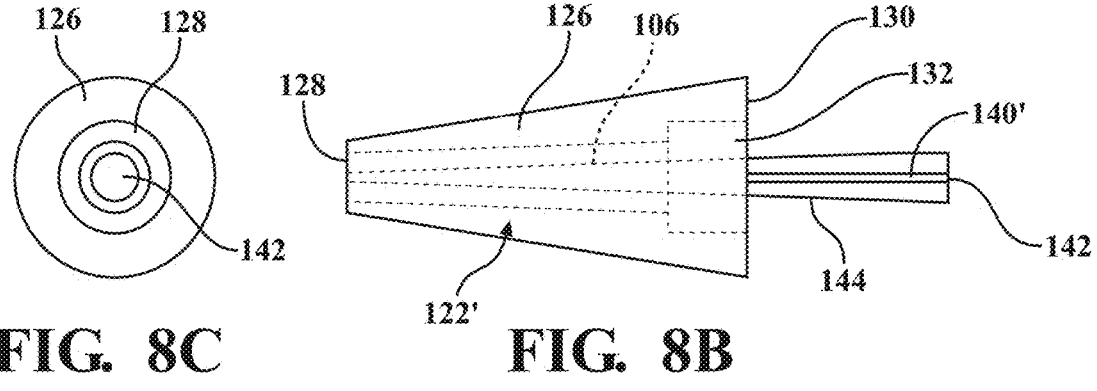
FIG. 7 is a close-up view of the glass body having an angled tip.
FIG. 8A is a perspective view of a positioning fixture according to another embodiment of the subject invention.
FIG. 8B is a cross-sectional view of the positioning fixture shown in FIG. 8A.
FIG. 8C is an end view of the positioning fixture shown in FIG. 8A.

With reference to FIG. 3, the positioning fixture 122 has an outer surface 126, a front face 128, and a rear face 130. The rear face 130 defines a mount 132 for operatively mounting to the head 118. Referring to FIGS. 6B and 8B, the mount 132 is further shown as being threaded. As one example, the mount 132 may a M6 or 0.25-32 thread.

Referring back to FIGS. 1 and 2, an extender 134 is operatively mounted between the positioning fixture 122 and the head 118. The extender 134 secures the positioning fixture 122 operatively to the rotating device 110. Additionally, the extender 134 may also serve as a secondary support for the glass body 102 for applications requiring the rotation of a large body around the center axis C, as discussed further discussed below. The extender 134 may also be threaded at one or both of the ends as either male or female connections. It is to be appreciated that the extender 134 may be used with certain types of glass bodies 102 and not used with other types of glass bodies 102.

The subject invention may also include an adapter 136 operatively mounted between the extender 134 and the head 118. The adapter 136 may also be threaded at one or both of the ends for mounting between the extender 134 and the head 118. It is to be appreciated that the adapter 136 may be used with certain types of glass bodies 102 and not used with other types of glass bodies 102. Further, in some embodiments, either the extender 134 or the adapter 136 may be omitted without deviating from the subject invention.

Referring to the glass body 102 shown in the Figures, the glass body 102 extends between the first end 112 and the second end 114. The tapered surface 106 of the positioning fixture 122 supports the glass body 102 such that the first end 112 and the second end 114 may lie transverse to the central axis C of the rotating device 110, and if present, the extender 134 and the adapter 136. In the embodiment shown in FIGS. 1 and 2, the positioning apparatus, the extender 134, and the adapter 136 are connected together and are centered axially along the central axis C.

FIG. 3 shows the central axis C along the extender 134, the adapter 136, and the positioning fixture 122. The glass body 102 is presented at a predetermined angle drawn along axis L. The predetermined angle between C and L, defined as θ, is controllable per the tapered surface 106.

Specifically, referring to FIG. 4, a close-up perspective view of the cleaving apparatus is shown. In this embodiment, the positioning fixture 122 has the extender 134 integrated therein and the positioning fixture 122 rotates about the central axis C. The laser beam 104 cleaves the glass body 102 at its first end 112, resulting in a lost shard S that is then disposed. The face 105 of the glass body 102 is then transformed into an angled geometry that matches the desired angle.

FIG. 6A shows the positioning fixture 122 having an inner bore 138 extending between the front face 128 and the rear face 130 with the inner bore 138 centered axially along the central axis C. In various embodiments, the positioning fixture 122 may have a conical shape. The tapered surface 106 is defined as a channel 140 in the outer surface 126 that extends between the front face 128 and the rear face 130. The tapered surface 106 has the predetermined angle of from greater than 0 degrees to 45 degrees. Referring to FIG. 5, the glass body 102 is disposed within the inner bore 138 so that the central axis C and the axial center L of the glass body 102 are aligned. As such, the glass body 102 is rotating around both C and L, resulting in a flat, 0° surface geometry. Such a configuration allows the positioning fixture 122 to produce two different types of surface geometry on the face 105, i.e. the face 105 having the desired angle and a flat geometry. One advantage of the subject invention is that various positioning fixtures 122 can be made having different predetermined angles. Thus, when a different angle is needed on a different glass body 102, the positioning fixture 122 is selected with the appropriate tapered surface. This allows for quick changes of the positioning fixture 122 while maintaining precise cleaving of the glass body 102.

Referring to FIG. 6B, a cross-sectional view is shown and FIG. 6C illustrates an end view of the positioning fixture 122 shown in FIG. 5. The positioning fixture 122 has the channel 140 that runs down the outer surface 126 to define the tapered surface 106 at the predetermined angle θ. The channel 140 ensures that compound angles are eliminated during the cleaving operation. The predetermined angle controls the cleave during the rotation and cleaving operation.

FIG. 7 is a close-up schematic view of the glass body 102 formed according to the invention using the positioning fixture 122 and having been exposed to the laser beam 104 while being rotated. The face 105 of the glass body 102 has the desired angle of 2 degrees.

Referring now to FIG. 8A, another embodiment of a positioning fixture 122' is shown. The positioning fixture 122' includes the front face 128, the rear face 130, the outer surface 126, and the inner bore 138, but with regard to this embodiment, the positioning fixture 122' defines the tapered surface 106 within the inner bore 138. An insert 142, sized to be disposed within the inner bore 138, is inserted into the inner bore 138. The tapered surface 106 is defined between the insert 142 and the inner bore 138 and the glass body 102 is secured at the predetermined angle therebetween. Specifically, the insert 142 has an outer surface 144 that is inclined at the predetermined angle to define the tapered surface 106. The outer surface 144 may also include a channel 140'. In such an embodiment, multiple different inserts 142 can be used that have different predetermined angles, such as 2 degrees, 5 degrees, and so forth. Alternatively, the inner bore 138 has an inclined surface 146 at the predetermined angle to define the tapered surface 106. The inclined surface 146 may also include the channel 140'. In a similar fashion, different positioning fixtures 122 can be prepared having the inner bore 138 with different predetermined angles that can be easily changed while maintaining the precision of the cleave. The tapered surface 106 can define the predetermined angle of from greater than 0 degrees, or at least 0.5 degrees, to 45 degrees.

FIG. 8B is a cross-sectional view of the positioning fixture 122' shown in FIG. 8A and FIG. 8C is an end view of the positioning fixture 122' shown in FIG. 8A. In this embodiment, the glass body 102 is located within the inner bore 138 and is secured in place by the insert 142. The glass body 102 is easily inserted and removed and requires no channeling as the glass body 102 is secured by the wedging dynamic of the tapered insert 142. The insert 142 may be disposed within the fixture and mates with at least a portion of the inner bore 138 to secure the glass body 102. In one embodiment, the inner bore 138 may include the channel 140' to receive the glass body 102. The insert 142 holds the glass body 102 in the channel 140'. Alternatively, the channel 140 may be formed in the insert 142. In yet another embodiment, the glass body 102 could be held in position by bonding or the like so that it could be removed after being cleaved. FIG. 8C shows the diameter and thicknesses of the positioning fixture 122', the inner bore 138 and the insert 142.

FIGS. 9A and 9B illustrate the positioning fixture 122' at two positions as it rotates about the central axis C. In FIG. 9A, one position of the glass body 102 is shown at −180 degrees and, in FIG. 9B, another position of the glass body 102 is shown at +180 degrees. FIG. 9C shows the glass rod at 90 degree intervals as the positioning fixture 122' rotates with two of the positions shown in phantom. In this embodiment, the taper angle is 2 degrees.

FIG. 10 is a close-up of the glass body 102 in the −180 degree and +180 degree positions within the rotation of the positioning fixture 122'. The ends 112, 114, of the glass body 102 are exact mirrors of one another during the rotation, allowing the laser beam 104 to cleave to the desired angle, φ. The predetermined angle θ corresponds to the desired angle φ.

Figures 11A, 11B, 11C, 11D:
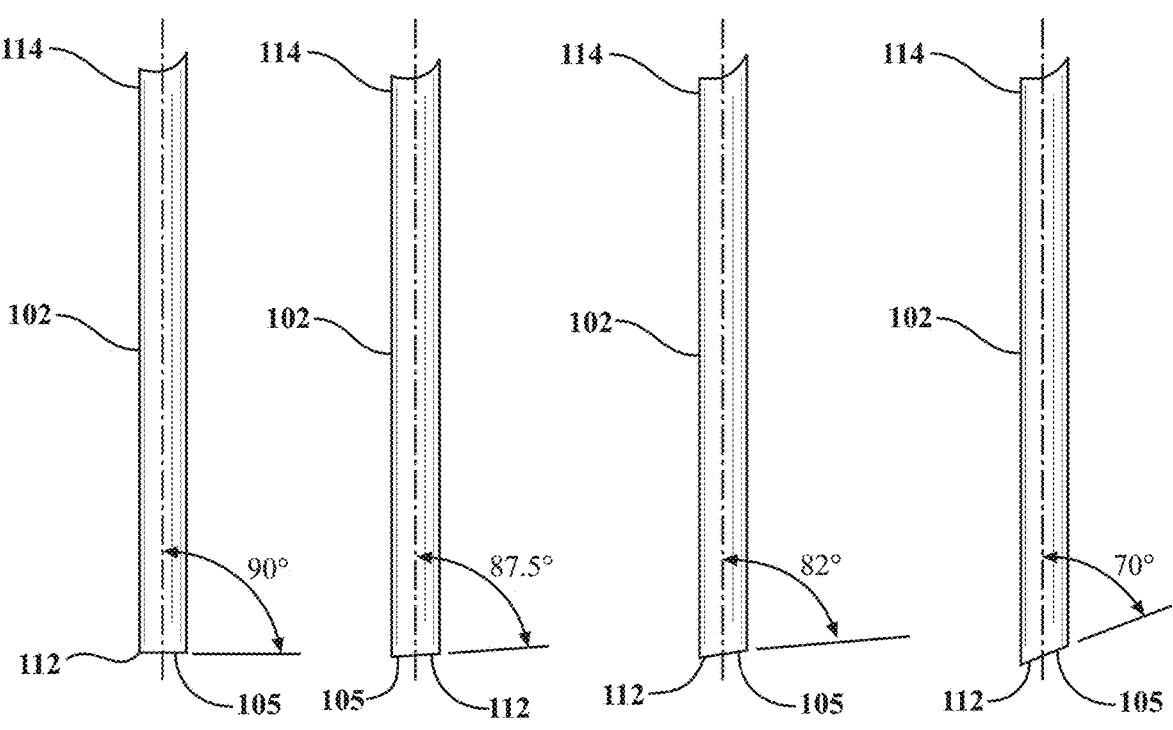
FIG. 11A-11D shows various cleave angles on different glass bodies formed according to the subject invention.

FIG. 11 shows the versatility of glass rods that can be achieved with the cleaving assembly 100 of the subject invention that utilizes positioning fixtures 122, 122' with different predetermine angles such that an endless array of glass body 102 cleave angles can be obtained. FIG. 11 shows the glass body 102 having the first end 112 with the desired angles range from 0 degrees to any angle desirable. The angles illustrated in FIGS. 11A-D are relative to the axial center L of the glass body 102. The axial center L has the predetermined angle defined by the tapered surface 124. The 90-degree angle would be denoted by those familiar with the art as a 0 degree cleave. The 87.5-, 86-, 82-, and 70-degree examples would represent a 2.5, 4, 8, and 20 degree cleave by those familiar with the art.

Figure 12:
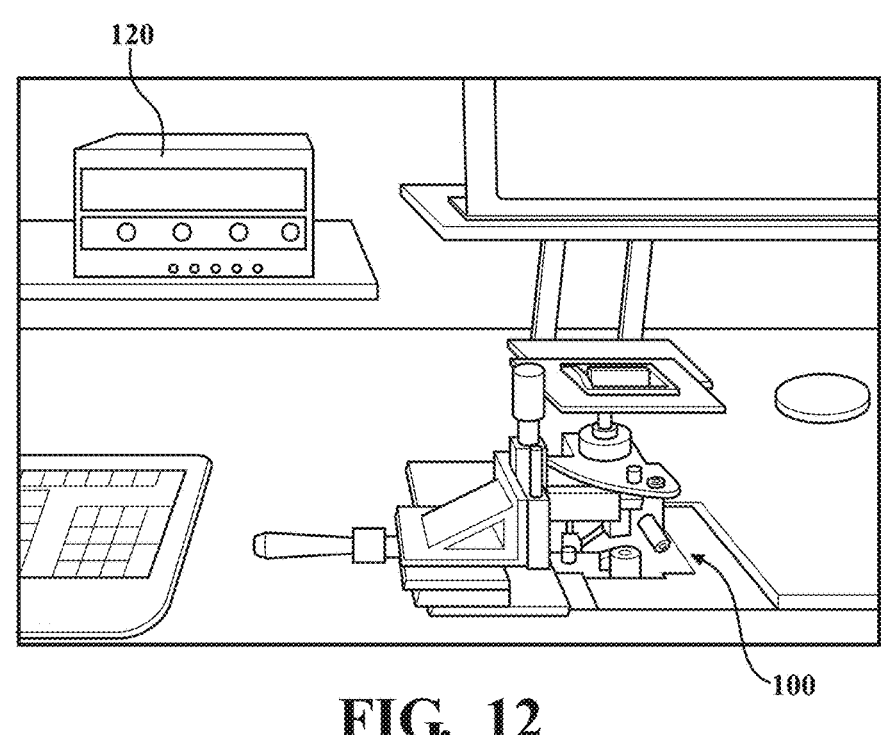
FIGS. 12-14 are schematics of one embodiment of a cleaving assembly according to the subject invention.
Figure 13:
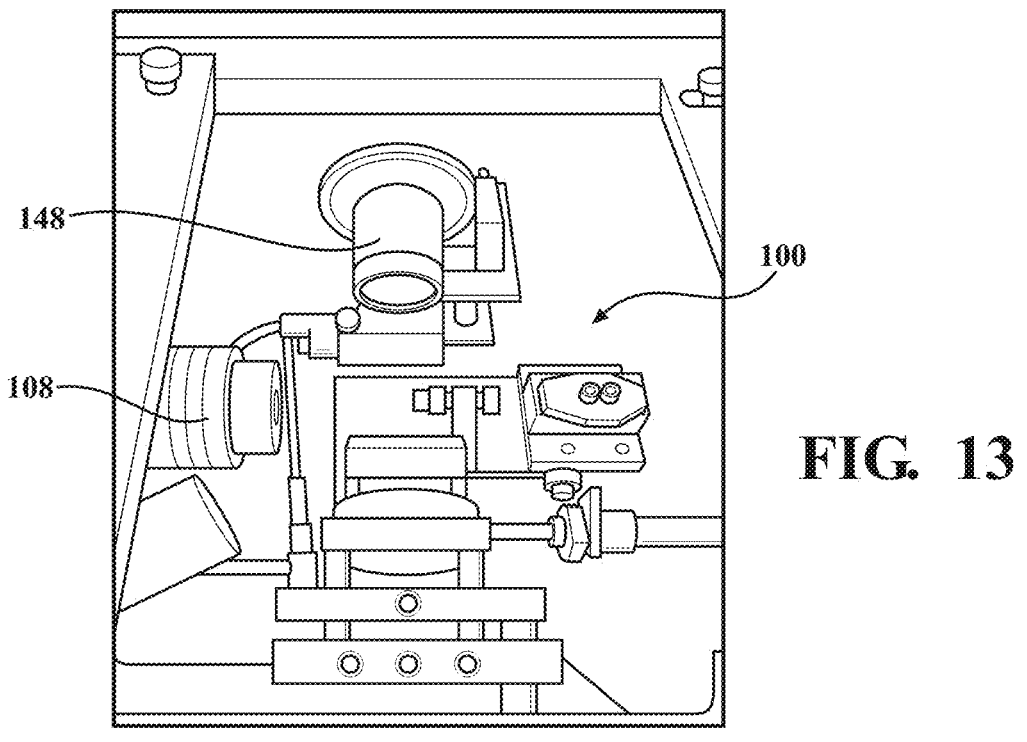
Figure 14:
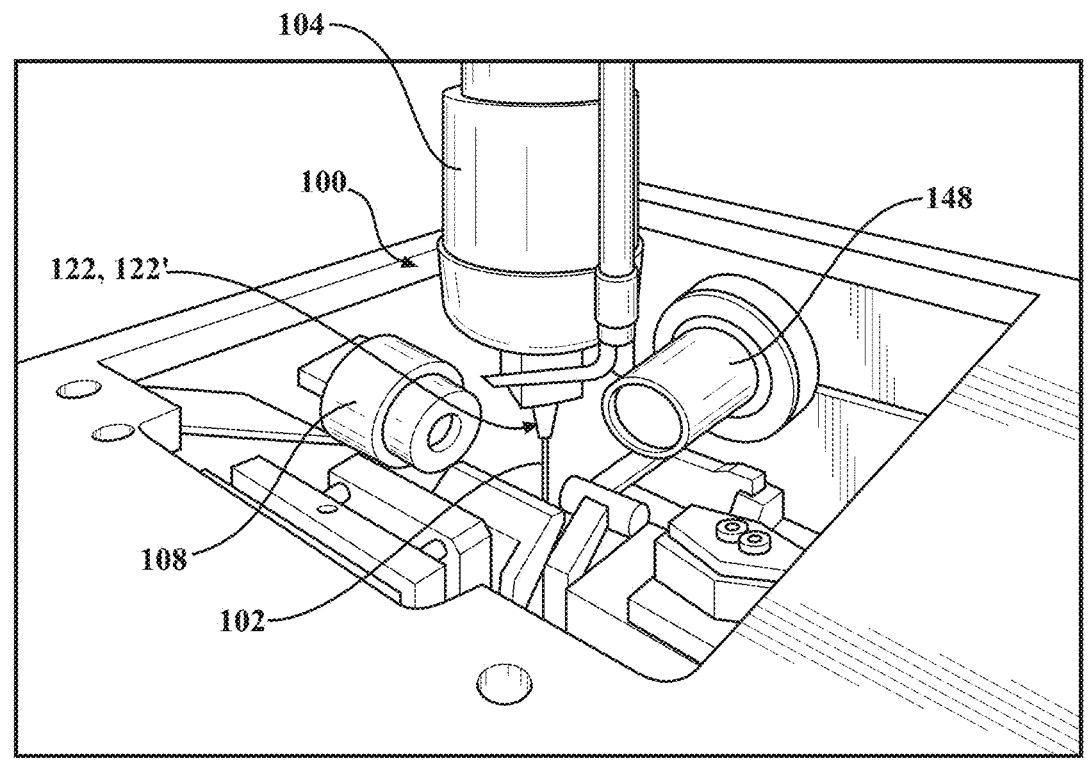

With reference to FIGS. 12-14, one embodiment of the cleaving assembly 100 according to the subject invention is shown. Specifically, FIG. 12 shows a DC power supply 120 connected to and powering the rotating device 110, as is well known to those skilled in the art. FIG. 13 shows the optical path of the laser head 118 and FIG. 14 shows a camera 148 and the laser device 108 and other optics.

Figure 15A:
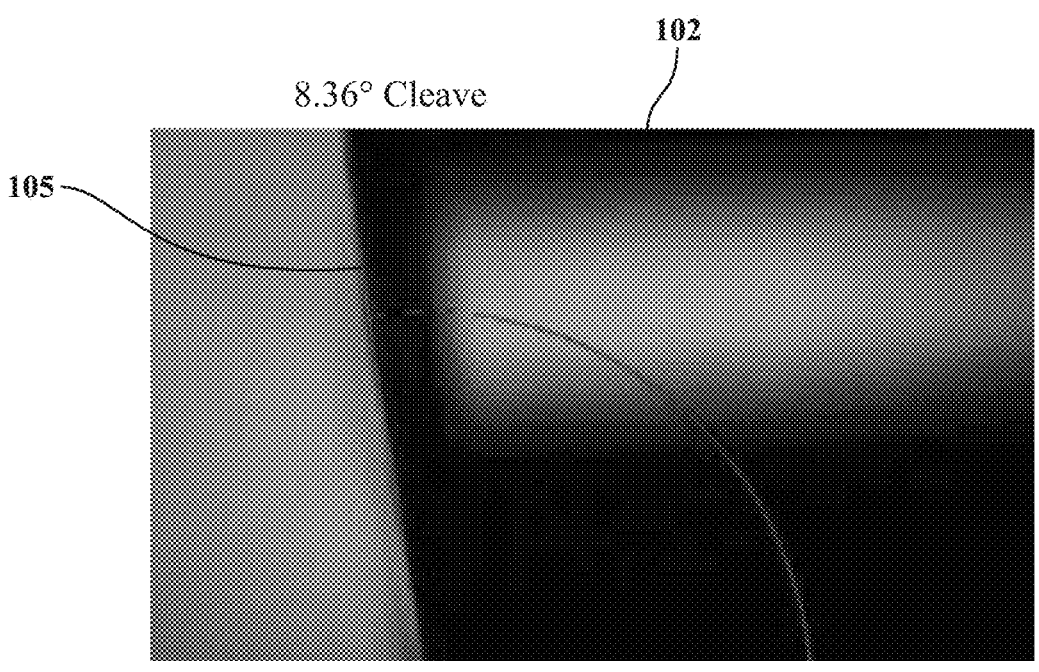
FIG. 15A is a photograph of a 1 mm glass rod having a cleave angle of 2.71 degrees.
Figure 15B:
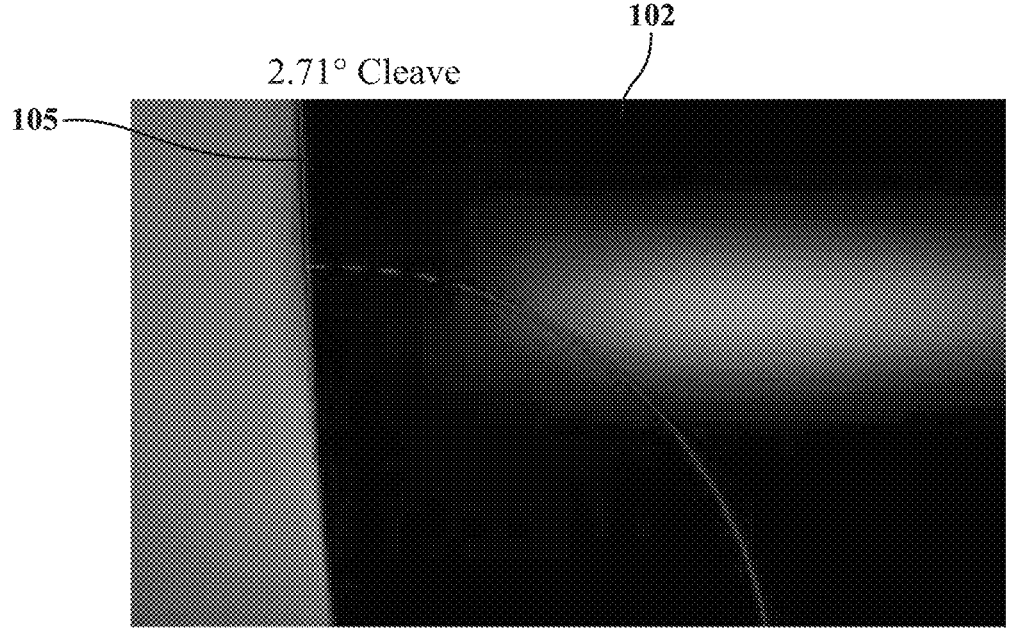
FIG. 15B is a photograph of a 1 mm glass rod having a cleave angle of 8.36 degrees.

With reference to FIGS. 15A-15B, close-up photographs of a 1 mm glass rod are shown that were effectively cleaved using the cleaving assembly 100 shown in FIGS. 12-14 Specifically, in FIG. 15A, the tip of the glass rod has been cleaved to an angle of 8.36 degrees, with a targeted value of 8.0 degrees. In FIG. 15B, the tip of the glass rod has been cleaved to an angle of 2.71 degrees, with a targeted value of 2.5 degrees.

Figure 16A:
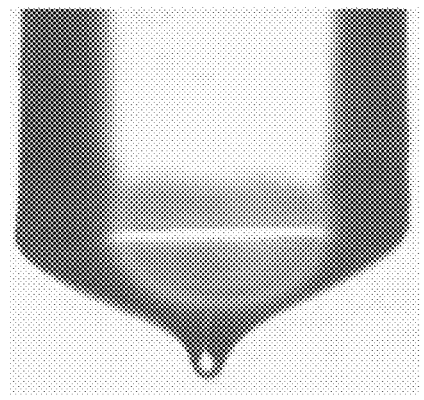
FIGS. 16A-16C are photographs of a perspective view of a glass body cleaved using prior art techniques.
Figure 16B:
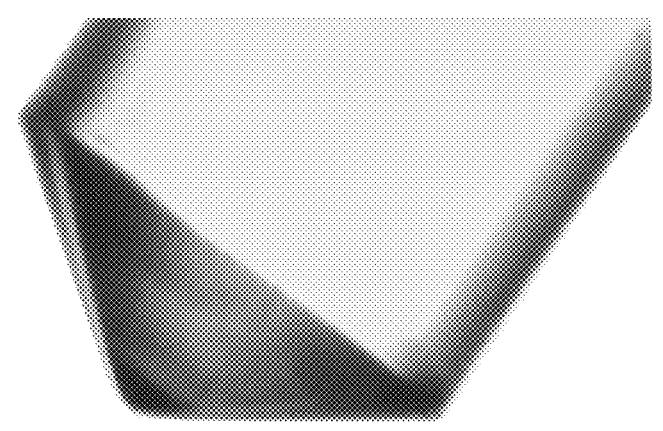
Figure 16C:
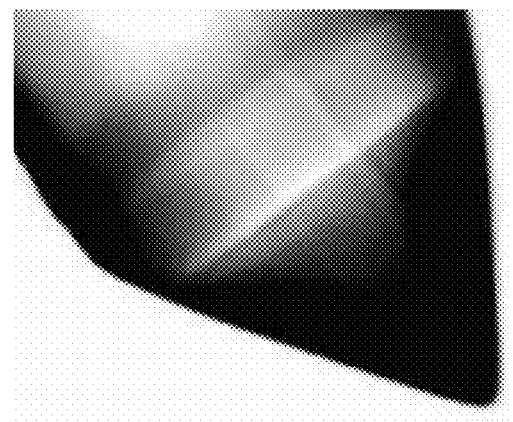

For illustrative purposes and to show the significance of the invention, rotating a glass body 102 during a laser cleaving process without the embodiment of this invention will create a conical or tapered surface 106 as shown in the photographs as FIG. 16A-16C. These approaches generally are not able to create a flat angle greater than 0 degrees without these type of detriments and irregularities. While rotating a glass body 102 around its axial center L during laser processing of large diameter fibers can reduce the entry/exit effects and create surfaces suitable for optical-grade transmission, this method is only viable for flat (0°) cleaves. FIGS. 16A-16C show glass bodies 102 that were merely rotated about its axial center L that was orthogonal to the laser beam 104 and an unacceptable conical or tapered surface geometry was obtained.

The subject invention also provides an optical fiber 150 having a transmitting portion 152 and an end cap 154 attached to an end of the transmitting portion 152 and a method of manufacturing the end caps 154 with a face 105 at a desired angle greater than 0 degrees and with reduced light-scattering or absorbing detriments using the cleaving assembly 100 described above. End capping typically requires splicing or fusing the end cap 154 onto the glass body 102 to reduce power densities. End caps 154 are also useful for altering the numerical aperture (NA), mode field diameter (MFD) and beam direction and properties (FL, Waist, etc.) from the transmitting portion 152.

The end caps 154 may be the same diameter as the transmitting portion 152, but the end caps 154 tend to have a larger diameter than the transmitting portion 152. The diameter of the end cap 154 can range from 200 microns to 2 mm Even if the end cap 154 has the same diameter as the transmitting portion 152, the end cap 154 may have properties different than the transmitting portion 152 depending upon the particular application. The end cap 154 has an initial length 156 that is less than a few millimeters, such as less than 5 mm. In some embodiments, the initial length 156 of the end cap 154 is from 0.5-3 mm After being cleaved, the end cap 154 has a final length 158 this is typically 3 mm or less, and may be 1 mm or less, depending upon the particular application.

Figure 17:
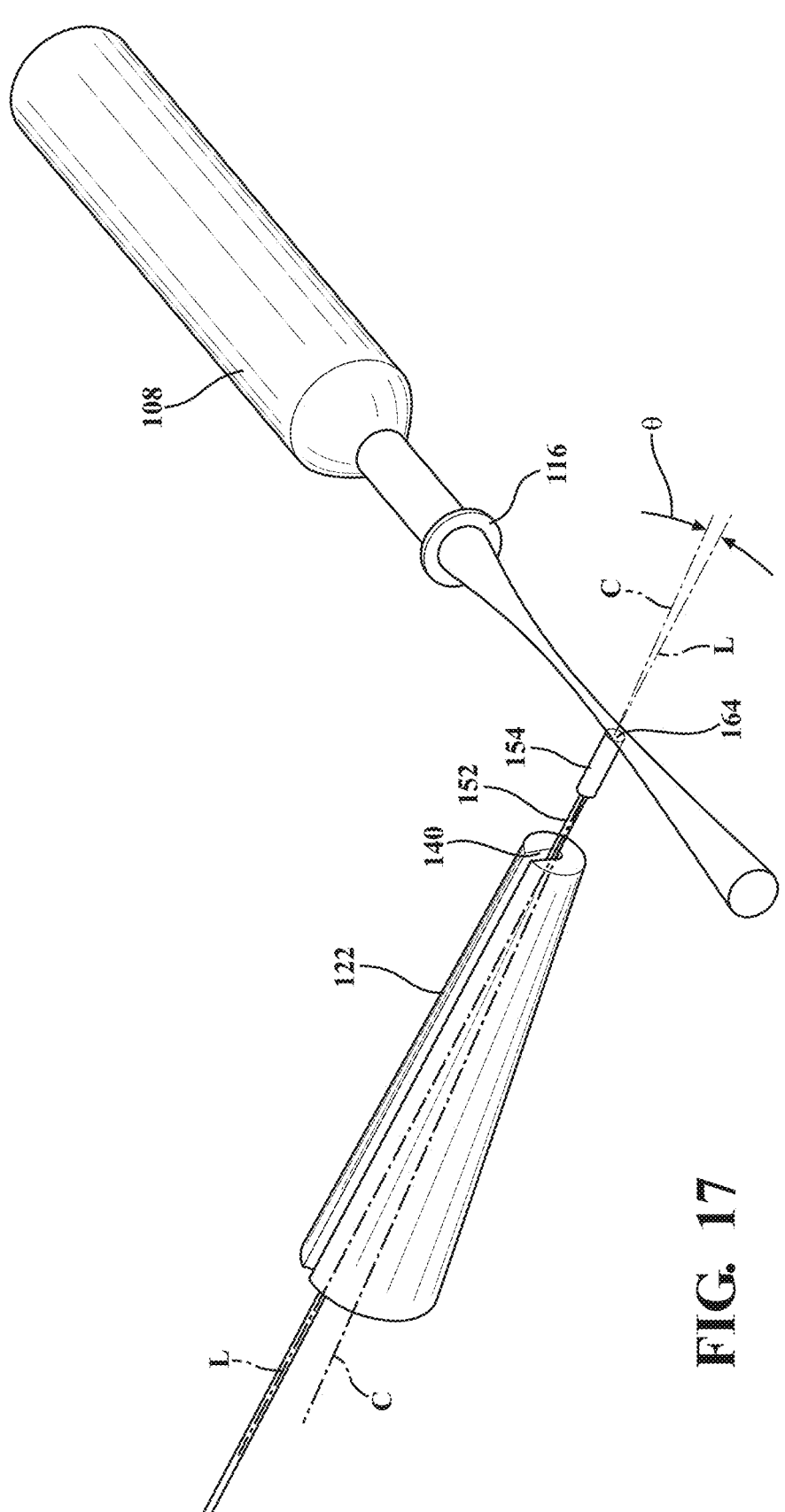
FIG. 17 is a perspective view of the positioning fixture according to the subject invention for cleaving an end cap of an optical fiber supported by a transmitting portion at a desired angle and final length.

The transmitting portion 152 may be formed of the same material as the glass body 102 described above. In this embodiment, the transmitting portion 152 is not finished with the angle cleaved face 105, but instead has a first end 160 that is flat for being attached to the end cap 154. As described above in connection with FIG. 5, the positioning fixture 122 may be used to create the first end 160 of the transmitting portion 152, although other techniques may be used. Referring to FIG. 17, one embodiment is shown having the end cap 154 attached to the transmitting portion 152. The attachment of the end cap 154 to the transmitting portion 152 is performed by standard techniques, such as splicing or fusing. The end cap 154 has a mounting end 162 and a terminal end 164 and extends an initial length 156 therebetween that is sufficient to attach the end cap 154 to the transmitting portion 152. The mounting end 162 of the end cap 154 is generally flat for attaching to the first end 160 of the transmitting portion 152. One issue with existing end capping techniques is that the end caps 154 tend to have a short length and therefore are difficult to properly attach to the transmitting portion 152. The subject invention allows for end caps 154 to have the initial length 156 sufficient to connect to the transmitting portion 152 and then be cleaved to the desired angle and does not require any additional polishing or finishing.

In the embodiment shown in FIG. 17, the end cap 154 and the transmitting portion 152 are preferably aligned along their respective central axes. Once the end cap 154 is connected to the transmitting portion 152, the transmitting portion 152 is mounted into the positioning fixture 122 and secured at the desired angle so that transmitting portion 152 lies transverse to the central axis C of the rotating device 110, and if present, the extender 134 and the adapter 136. Since the end cap 154 is attached to the transmitting portion 152, the end cap 154 is also held at the desired angle. The positioning fixture 122 is rotated about the central axis while the transmitting portion 152 and the end cap 154 are held along the predetermined angle L. The laser beam 104 cleaves the terminal end 164 of the end cap 154 resulting in a lost shard that is then disposed. The terminal end 164 of the end cap 154 has the face 105 that is transformed into an angled geometry that matches the desired angle. The subject invention also precisely cleaves the end cap 154 having the desired final length 158.

Figure 18A:
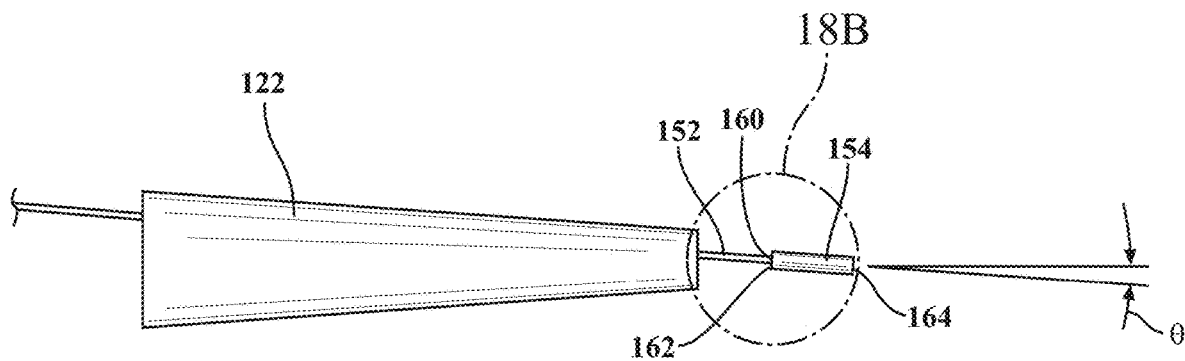
FIG. 18A is a side-view of the embodiment shown in FIG. 17.
Figure 18B:
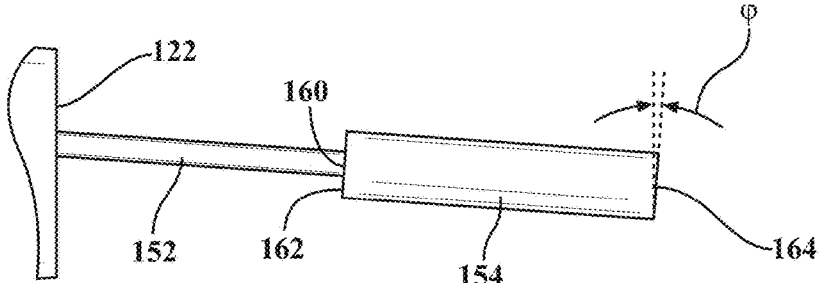
FIG. 18B is a close-up view of the positioning fixture having the transmitting portion secured therein along the tapered surface and the end cap extends from the positioning fixture at the predetermined angle

FIG. 18A is a close-up view of the positioning fixture 122 having the transmitting portion 152 secured therein along the tapered surface 106 and the end cap 154 extends from the positioning fixture 122 at the predetermined angle θ relative to the central axis C defined by the tapered surface 106. FIG. 18B is a close-up in FIG. 18A. The end cap 154 is shown having a pre-cleave angle and a post-cleave angle.

Figures 19A, 19B, 19C:
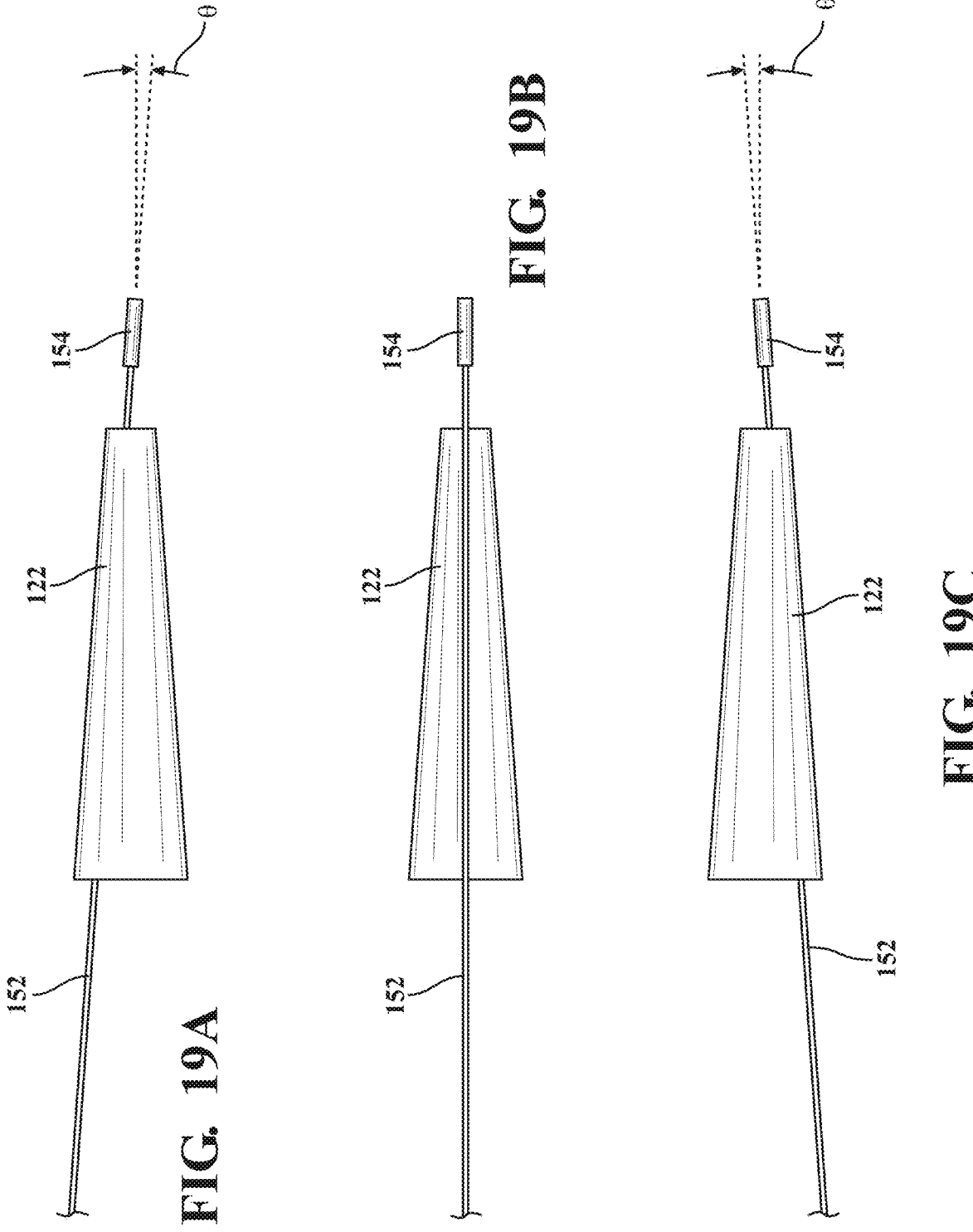
FIGS. 19A-C are schematic views of the positioning fixture shown in FIG. 18A at discrete points of rotation about the central axis.

Referring to FIGS. 19A-C, the positioning fixture 122 is shown at three positions as it rotates about the central axis C. In FIG. 19A, one position of the transmitting portion 152 and end cap 154 are shown at 0 degrees and, in FIG. 19B, another position of the transmitting portion 152 and end cap 154 are shown at +90 degrees. FIG. 19C shows the transmitting portion 152 and end cap 154 at +270 degrees. In this embodiment, the taper angle is 4 degrees.

Figures 20A, 20B:
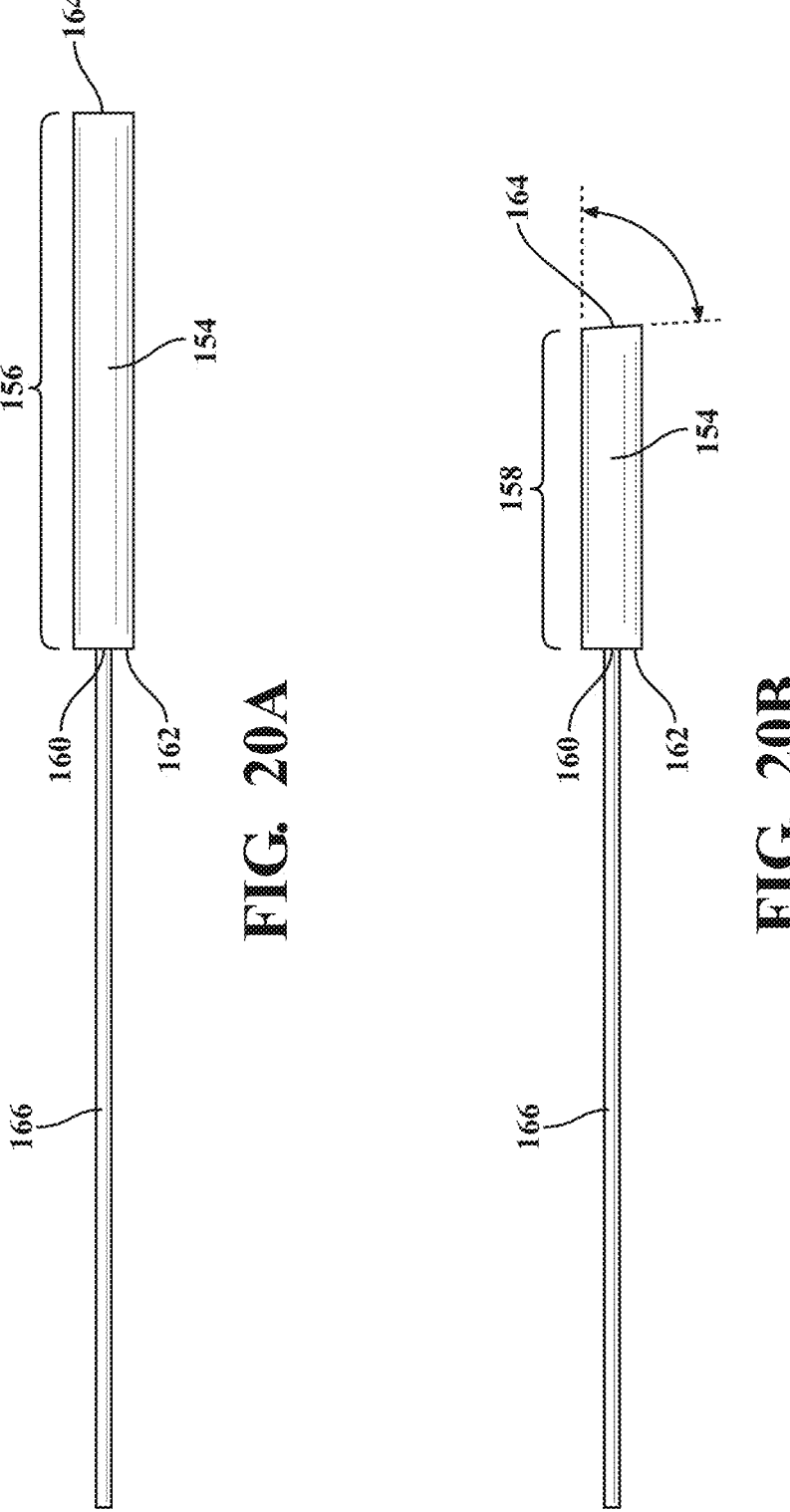
FIG. 20A is a side view of a support rod having an end cap supported thereon with an initial length and a terminal end with a flat face in a pre-cleave state.
FIG. 20B is a side view of a support rod having an end cap supported thereon with a final length and a terminal end with a desired angle in a post-cleave state.

FIG. 20A shows a pre-cleave state of the optical fiber 150 having the end cap 154 attached to the first end 160 of the transmitting portion 152 prior to the end cap 154 being cleaved and having the initial length 156 of about 5 mm FIG. 20B shows a post-cleave state of the optical fiber 150 having cleaved the end cap 154 at the desired angle of about 4 degrees and the final desired length 158 of about 3 mm. The final desired length 158 of the end cap 154 can be greater than 0.3 mm. In another embodiment the final desired length 158 is from 0.3 to 3 mm or less. In yet another embodiment, the final desired length 158 is greater than 0.3 mm and less than 2 mm. The final desired length 158 is able to be precisely controlled with the subject invention. In one embodiment, the desired length is determined mathematically by modeling the propagating wavelength; the transmitting portion 152 core diameter, mode field diameter, and numerical aperture; the chemical and refractive index properties of the end cap 154; and the final optical output required by the application. By cleaving the end cap 154 after it is connected to the transmitting portion 152, the precise angle and precise final desired length 158 are achieved and can be manipulated and controlled for specific end use applications. Further, as the beam of light exits the end cap 154, the optical properties can be monitored with a detector, a beam analyzer, or visually in-situ and algorithmically fed back into the system for fine adjustment. The end cap 154 is continued to be cleaved until the desired angle and the final desired length 158 producing the desired optical properties of the beam of light are obtained.

It is to be appreciated that the method described above for manufacturing end capped optical fibers 150 could be performed in any of the embodiments described herein. For example, the transmitting portion 152 may be supported along the tapered surface 106 in the channel in the outer surface 106 of the positioning fixture 122 with the channel 140 defining the predetermined angle as described above in connection with FIG. 4A or the transmitting portion 152 may be supported along the tapered surface 106 by disposing the transmitting portion 152 within the inner bore 138 of the positioning fixture 122 defining the predetermined angle as described above in connection with FIG. 8A.

The subject invention can also be used to manufacture end caps 154 having the desired final length 158 and desired angle, by using a temporary bond between the transmitting portion 152 as a support rod and the end cap 154, forming a temporary glass body 166. For example, an adhesive may be used to bond the first end 160 to the support rod or an adhesive tape may be used to secure the end cap 154 to the support rod. Next, the rotating device 110 and the positioning fixture 122 are positioned centrally aligned along the central axis that is orthogonal to the laser beam and the positioning fixture 122 is mounted to the head 118 of the rotating device 110.

The support rod is supported so that at least the end cap 154 extends transverse to the central axis at the predetermined angle. The positioning fixture 122 and the head 118 of the rotating device 110 are rotated about the central axis while the support rod and end cap 154 are temporary joined such that the laser beam cleaves the terminal end 164 of the end cap 154 at a desired angle corresponding to the predetermined angle. Then, the end cap 154 is removed, such as by breaking or fracturing or removing the adhesive tape, from the transmitting portion 152 to dissemble the transmitting portion 152 and the mounting end 162 of the end cap 154 is finished to achieve an acceptable surface 106 thereon. As one example of finishing the mounting end 162, well-known polishing techniques can be used. The end cap 154 can then be attached to other optical fibers 150 in known techniques.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A method of cleaving a glass rod at angles greater than 0 degrees and less than 90 degrees and with a face free of a lens or taper with a cleaving assembly, the cleaving assembly including a laser device for emitting a laser beam, a rotating device having a head, and a positioning fixture, said method comprising:

positioning the rotating device and the positioning fixture centrally aligned along a central axis that is orthogonal to the laser beam;

mounting the positioning fixture to a head of the rotating device;

providing a glass rod having diameter of at least 125 μm;

supporting the glass rod along a tapered surface of the positioning fixture, the tapered surface extending transverse to the central axis at a predetermined angle;

rotating the positioning fixture and the head of the rotating device about the central axis while the glass rod is supported at the predetermined angle such that the laser beam cleaves a face of the glass rod at a desired angle greater than 0 degrees and less than 90 degrees and with a face free of a lens or taper.

2. The method as set forth in claim 1, wherein the step of supporting the glass rod with the tapered surface is further defined as disposing the glass rod in a channel in an outer surface of the positioning fixture with the channel defining the predetermined angle.

3. The method as set forth in claim 1, wherein the step of supporting the glass rod with the tapered surface is further defined as disposing the glass rod within an inner bore of the positioning fixture defining the predetermined angle.

4. The method as set forth in claim 3, further comprising inserting an insert into the inner bore to define the predetermined angle.

5. The method as set forth in claim 1 wherein the tapered surface has the predetermined angle of from greater than 0 degrees to 45 degrees.

6. A method of manufacturing an optical fiber having a transmitting portion and an end cap with a face at a desired angle greater than 0 degrees and with reduced light-scattering or absorbing detriments with a cleaving assembly, the cleaving assembly including a laser device for emitting a laser beam, a rotating device having a head, and a positioning fixture, said method comprising:

providing the transmitting portion extending between a first end and a second end and having a diameter of at least 125 μm;

providing the end cap formed of a glass material extending between a terminal end to be cleaved at the desired angle and a mounting end, the end cap having a diameter and having an initial length;

securing the first end of the transmitting portion to the mounting end of the end cap;

positioning the rotating device and the positioning fixture centrally aligned along a central axis that is orthogonal to the laser beam;

mounting the positioning fixture to the head of the rotating device;

supporting the transmitting portion along a tapered surface of the positioning fixture, so that the transmitting portion and the end cap extends transverse to the central axis at a predetermined angle; and rotating the positioning fixture and the head of the rotating device about the central axis such that the laser beam cleaves the terminal end of the end cap at a desired angle corresponding to the predetermined angle and at a final desired length.

7. The method as set forth in claim 6, wherein the step of supporting the transmitting portion with the tapered surface is further defined as disposing the transmitting portion in a channel in an outer surface of the positioning fixture with the channel defining the predetermined angle.

8. The method as set forth in claim 6, wherein the step of supporting the transmitting portion with the tapered surface is further defined as disposing the transmitting portion within an inner bore of the positioning fixture defining the predetermined angle.

9. The method as set forth in claim 8, further comprising inserting an insert into the inner bore to define the predetermined angle.

10. The method as set forth in claim 6 wherein the tapered surface has the predetermined angle of from greater than 0 degrees to 45 degrees.

11. The method as set forth in claim 6 wherein the final desired length is from 0.3 mm to 3 mm.

12. The method as set forth in claim 6 wherein the final desired length is greater than 0.3 mm and less than 2 mm.

13. The method as set forth in claim 6 further comprising transmitting a beam of light along the transmitting portion and the end cap while the laser beam cleaves the terminal end of the end cap.

14. The method as set forth in claim 13 further comprising detecting optical properties of the beam of light as the beam of light exits the end cap with a detector and adjusting the laser cleaved end cap angle and length to optimize desired optical properties.

15. A method of manufacturing fiber end caps with a face at a desired angle greater than 0 degrees and with reduced light-scattering or absorbing detriments with a cleaving assembly, the cleaving assembly including a laser device for emitting a laser beam, a rotating device having a head, and a positioning fixture, said method comprising:

providing a support rod extending between a first end and a second end and having a diameter of at least 125 μm;

providing an end cap formed of a glass material extending between a terminal end to be cleaved at a desired angle and a final desired length and a mounting end;

securing the first end of the support rod to the mounting end of the end cap to form a temporary glass body;

positioning the rotating device and the positioning fixture centrally aligned along a central axis that is orthogonal to the laser beam;

mounting the positioning fixture to the head of the rotating device;

supporting the temporary glass body so that the temporary glass body extends along a tapered surface of the positioning fixture and the end cap extends transverse to the central axis at the desired angle;

rotating the positioning fixture and the head of the rotating device about the central axis while the temporary glass body is supported such that the laser beam cleaves the terminal end of the end cap at the desired angle and the final desired length; and removing the end cap from the support rod to dissemble the temporary glass body and finishing the mounting end of the end cap to achieve an acceptable surface thereon.

16. The method as set forth in claim 15 wherein the step of finishing the mounting end is further defined as polishing the mounting end.

17. The method as set forth in claim 15 wherein the step of removing the end cap is further defined as breaking the end cap from the support rod.

18. The method as set forth in claim 15 wherein the step of securing the end of the support rod to the mounting end of the end cap is further defined as adhesively bonding the end of the support rod to the mounting end of the end cap to allow for removal therefrom.

19. The method as set forth in claim 15, wherein the step of supporting the support rod with the tapered surface is further defined as disposing the support rod in a channel in an outer surface of the positioning fixture with the channel defining a predetermined angle.

20. The method as set forth in claim 15, wherein the step of supporting the support rod with the tapered surface is further defined as disposing the support rod within an inner bore of the positioning fixture defining a predetermined angle.

21. The method as set forth in claim 20, further comprising inserting an insert into the inner bore to define the predetermined angle.

22. The method as set forth in claim 15 wherein the tapered surface has a predetermined angle of from greater than 0 degrees to 45 degrees.

23. The method as set forth in claim 15 wherein the final desired length is from 0.3 mm to 3 mm.

24. The method as set forth in claim 15 wherein the final desired length is greater than 0.3 mm and less than 2 mm.

\* \* \* \* \*